US008972860B2

(12) United States Patent
Corbett et al.

(10) Patent No.: US 8,972,860 B2
(45) Date of Patent: Mar. 3, 2015

(54) PLAYER INSTANCE MANAGEMENT

(75) Inventors: Jim D. Corbett, Berkeley, CA (US); Rupen Chanda, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1235 days.

(21) Appl. No.: 12/570,451

(22) Filed: Sep. 30, 2009

(65) Prior Publication Data
US 2013/0167005 A1 Jun. 27, 2013

(51) Int. Cl.
G06F 17/00 (2006.01)
G06F 17/30 (2006.01)

(52) U.S. Cl.
CPC .......... *G06F 17/30* (2013.01); *G06F 17/30058* (2013.01)
USPC ............ 715/717; 715/200; 715/234; 715/700

(58) Field of Classification Search
CPC ..................... G06F 17/30; G06F 17/30058
USPC ................... 715/200, 234, 700, 717
See application file for complete search history.

(56) References Cited

U.S. PATENT DOCUMENTS

| | | | | |
|---|---|---|---|---|
| 6,978,417 | B1* | 12/2005 | Kohn et al. | 715/202 |
| 7,496,845 | B2* | 2/2009 | Deutscher et al. | 715/726 |
| 2002/0161797 | A1* | 10/2002 | Gallo et al. | 707/500.1 |
| 2004/0003102 | A1* | 1/2004 | DuVall et al. | 709/231 |
| 2005/0138560 | A1* | 6/2005 | Lee et al. | 715/719 |
| 2005/0289475 | A1* | 12/2005 | Martin et al. | 715/765 |
| 2006/0053384 | A1* | 3/2006 | La Fetra et al. | 715/765 |
| 2006/0129916 | A1* | 6/2006 | Volk et al. | 715/513 |
| 2006/0150092 | A1* | 7/2006 | Atkins | 715/517 |
| 2007/0252841 | A1* | 11/2007 | Kim | 345/522 |
| 2008/0235142 | A1* | 9/2008 | Gonze et al. | 705/59 |
| 2008/0235580 | A1* | 9/2008 | Gonze et al. | 715/700 |
| 2008/0235588 | A1* | 9/2008 | Gonze et al. | 715/719 |
| 2009/0006963 | A1* | 1/2009 | Gonze et al. | 715/717 |
| 2009/0164641 | A1* | 6/2009 | Rogers et al. | 709/227 |
| 2009/0177301 | A1* | 7/2009 | Hayes | 700/94 |
| 2009/0228897 | A1* | 9/2009 | Murray et al. | 719/313 |
| 2009/0254827 | A1* | 10/2009 | Gonze et al. | 715/716 |
| 2009/0259926 | A1* | 10/2009 | Deliyannis | 715/205 |
| 2010/0005417 | A1* | 1/2010 | Lanahan et al. | 715/815 |

(Continued)

OTHER PUBLICATIONS

WebSiteOptimization.com "JavaScript: Refer Execution." [online], [retrieved on Jun. 1, 2009]. Retrieved from the Internet <URL: http://www.websiteoptimization.com/speed/tweak/defer>, 6 pages.

(Continued)

*Primary Examiner* — Stephen Hong
*Assistant Examiner* — Marshon Robinson
(74) *Attorney, Agent, or Firm* — Wolfe-SBMC

(57) ABSTRACT

Methods, systems, and apparatus, including computer programs encoded on a computer storage medium, for media player instance management. In one aspect, a method includes receiving one or more requests from an application to load a plurality of media players referenced in a document to be presented by the application, in which each media player is configured to present respective content in a respective presentation area of the document presentation and determining an order for loading the media players based on a visibility and dimensions of each respective presentation area.

18 Claims, 6 Drawing Sheets

(56) References Cited

U.S. PATENT DOCUMENTS

2010/0115119 A1* 5/2010 Gallo et al. .................. 709/230
2010/0275221 A1* 10/2010 DuVall et al. ................ 719/328

OTHER PUBLICATIONS

Osdir.com "Dynamically Loading Plugins, etc." [online], [retrieved on Jun. 1, 2009]. Retrieved from the Internet <URL: http://osdir.com/ml/editors.jedit.devel/2002-07/msg00101.html>, 2 pages.

Developer.com "Lazy Loading the ASP.NET AJAX TabContainer Control." [online], [retrieved on Jun. 1, 2009]. Retrieved from the Internet <URL: http://www.developer.com/net/asp/article.php/3738616>, 5 pages.

Appelsiini.net "Lazy Load—Image Lazy Loader Plugins for jQuery." [online], [retrieved on Jun. 1, 2009]. Retrieved from the Internet <URL: http://www.appelsiini.net/projects/lazyload>, 2 pages.

Developer.apple.com "Runtime Environment." [online], [retrieved on Jun. 1, 2009]. Retrieved from the Internet <URL: http://developer.apple.com/documentation/networking/Conceptual/Open_Dir_Plugin/RuntimeEnvironment/Ru>, 2 pages.

* cited by examiner

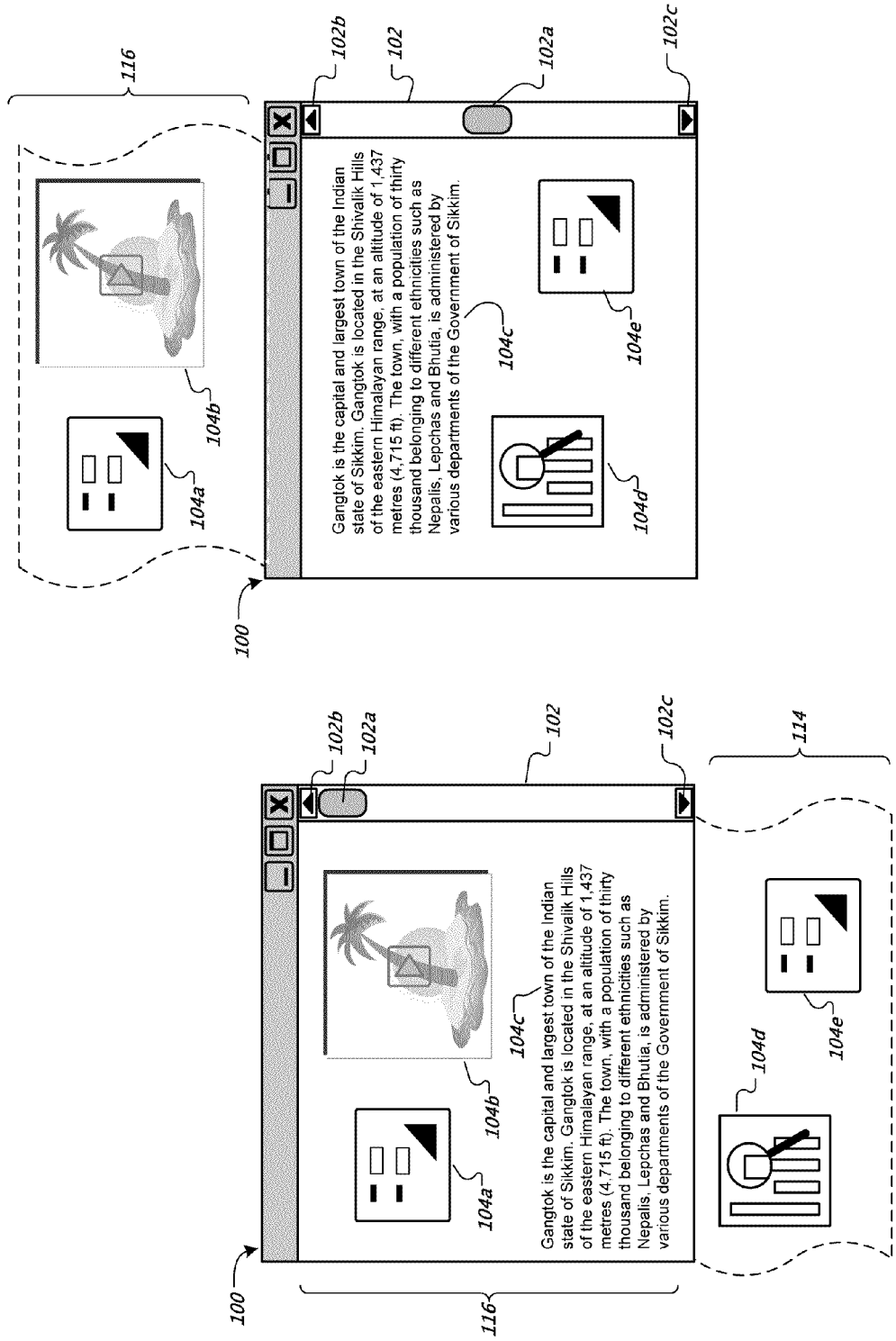

PLAYER INSTANCE MANAGEMENT

BACKGROUND

A web browser is a software application for retrieving, presenting, and traversing information resources on the World Wide Web. An information resource is typically identified by a Uniform Resource Locator (URL) and may be a web page, image, video, or other piece of content. Hyperlinks present in resources enable users to easily navigate their browsers to related resources. Aside from HTML, web browsers can generally display any kind of content that can be part of a web page. Most browsers can display images, audio, video, and XML files, and often have plug-ins to support Flash applications and Java applets.

SUMMARY

In general, one aspect of the subject matter described in this specification can be embodied in a method that includes receiving one or more requests from an application to load a plurality of media players referenced in a document to be presented by the application, in which each media player is configured to present respective content in a respective presentation area of the document presentation; in response to receiving the requests, sending one or more confirmation messages to the application indicating that the media players are loaded while deferring loading of one or more of the media players; determining an order for loading the media players based on a visibility and dimensions of each respective presentation area; and responsive to sending the confirmation messages, loading a subset of the media players and the deferred media players, according to the ordering. Other embodiments of this aspect include corresponding systems, apparatus, and computer program products.

These and other embodiments can optionally include one or more of the following features. Loading the subset of media players can include determining resources available for the media players and limiting a number of media players in the subset based on the resources available. Loading the subset of media players can include limiting a number of media players in the subset based on a threshold number of media players. One or more media players having respective presentation areas in a first size range can be given a higher priority in the ordering than one or more other media players having respective presentation areas that are not in the first size range. One or more of the media players having respective content associated with a first domain associated with the document can be given a higher priority in the ordering than one or more other media players having respective content associated with a different second domain different which is not associated with the document. Determining that a first loaded media player's respective presentation area is no longer visible and pausing the first media player in response to the determining. The application can be a web browser. The document can include a respective rank for one or more of the media players and wherein the order is based on the respective ranks A plurality of stored state information can be received wherein the state information is used to load the media players according to the ordering.

In general, one aspect of the subject matter described in this specification can be embodied in data structure encoded on a computer-readable medium comprising a reference to a window for a media player to render to; a set of one or more Hypertext Markup Language (HTML) parameters for the media player; and a reference to media player content.

Particular embodiments of the subject matter described in this specification can be implemented so as to realize one or more of the following advantages. The loading and unloading of players is done according to the resources available to the particular system, which allows the user to interact with electronic documents using an application without having to be mindful of the resource requirements necessary to do so. This can provide the user with a substantially similar user experience regardless of the type of system used to execute the application. Techniques described herein can make more efficient use of resources, allowing resources to be allocated to other activities being performed by the system. Furthermore, the application used to view the documents can be more responsive because the system that implements techniques described herein loads a subset of the content contained in the documents being presented to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B illustrate a graphical user interface for displaying an example document.

Like reference numbers and designations in the various drawings indicate like elements.

DETAILED DESCRIPTION

Figure 2A:
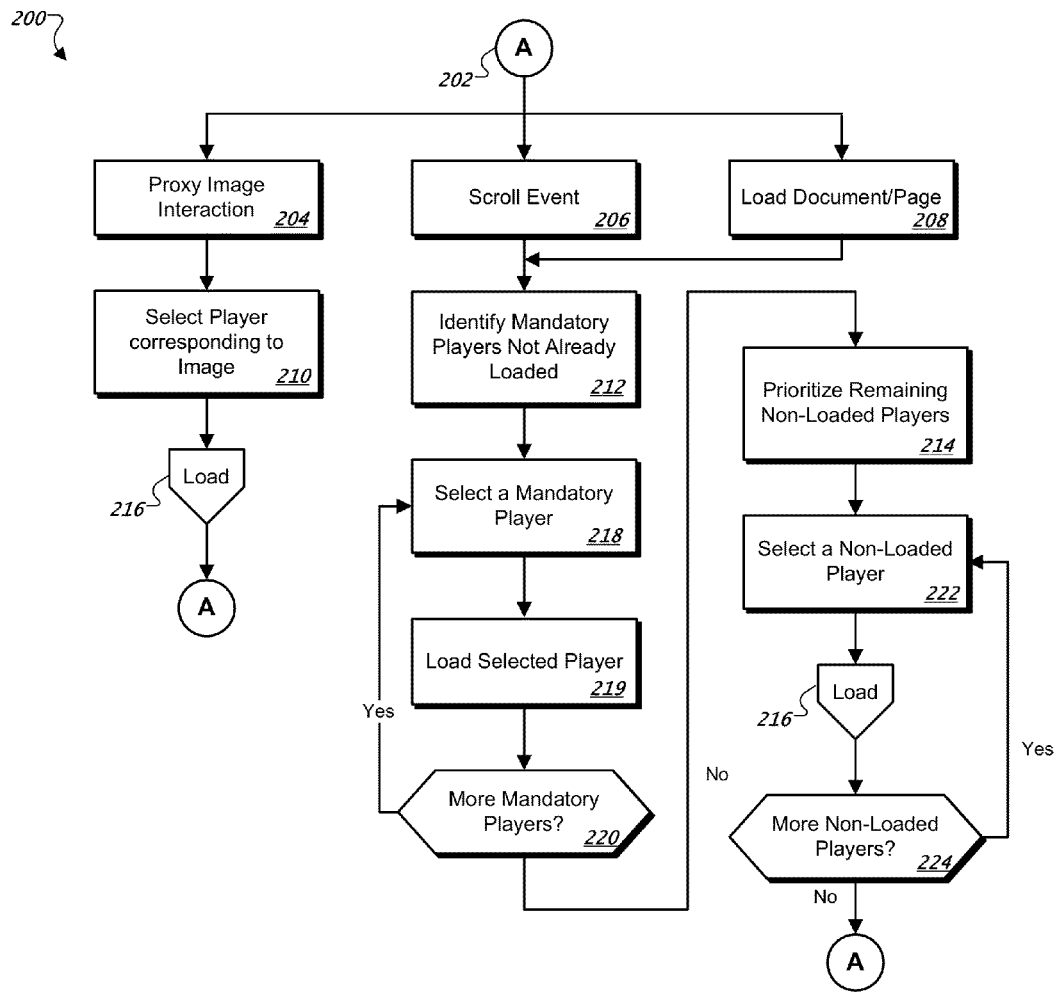
FIGS. 2A and 2B include flow charts illustrating example techniques for determining when to load and pause media players.

FIG. 1A illustrates an example graphical user interface (GUI) window 100 for displaying an example electronic document (or "document") containing content 104a-e. Generally speaking, content is comprised of one or more content types such as, for example, text (e.g., 104c), audio, still images (e.g., 104e), hyper media, animation, video (e.g., 104b), interactive content forms (e.g., 104a), and so on. Other content types are possible. A document can include various content types including content types that can be played or rendered by media players. In general, a media player is a computer program that is included in or otherwise accessible to a web browser application or other application and is capable of playing or presenting content. One example media player is an Adobe Flash Player from by Adobe Systems Incorporated of San Jose, Calif., but other media players are possible. In some implementations, a media player is itself content.

The window 100 displays a portion 116 of a document that includes content 104a-c while the non-displayed portion 114 containing content 104d-e remains hidden from view. In some implementations, a document is a Hypertext Markup Language (HTML) document and the window 100 is presented by a web browser application or an application with similar functionality. Other types of documents and applications which present them are possible, however. A scrollbar 102 or other GUI mechanism allows users to interactively select which portion of the document to display in window 100 by moving a scrollbar 102a up or down, or by selecting buttons 102b or 102c to perform the equivalent functions. For example, in order to view document portion 114, users can reposition the scroll bar 102a to the position shown in FIG. 1B. As a result, the hidden document portion 114 is displayed in GUI 100 and the formerly displayed document portion 116 is now hidden.

Content which requires a media player for its presentation generally requires that the media player is "loaded" or invoked by the application that wishes to display the content. A loaded or executing media player consumes resources such as computer memory, CPU cycles, and network bandwidth, for example. On portable devices with limited amount of memory, CPU cycles and battery life, such resources should be utilized carefully. In various implementations, a given media player is loaded depending on different factors which are described below. For example, such a determination could result in deferring the loading of media players associated with non-displayed content (e.g., 104d and 104e in FIG. 1A) or unloading of media players that are no longer displayed (e.g., 104a and 104b in FIG. 1B).

In some implementations, the media players can be different media players. For example, media players 104a and 104c can be Adobe Flash Players, and media players 104b and 104d can be Silverlight Media Players developed using Silverlight from Microsoft Corporation of Redmond, Wash.

FIG. 2A illustrates an example technique 200 for determining when to load and pause media players. In some implementations, the technique 200 is performed by an application (e.g., a web browser) or, in further implementations, the logic of technique 200 is performed by media players themselves. Performance of the technique 200 in one scenario occurs when a new document, or a new page of the document, is loaded by the application (208), or there is a GUI event such as an indication that a previously hidden portion of the document is displayed (e.g., by way of users interacting with a scrollbar, for example).

In various implementations, mandatory media players that are not already loaded are identified (212). Mandatory media players can be identified in some implementations by a code or other indication contained in the document or in the document's content. For example, a hypertext mark-up language (HTML) statement can be used to specify one or more mandatory media players that a module, such as a multimedia player management module (described in more detail below), or other program logic should load before loading any other players (e.g., by specifying "mustLoad=true" or "hasPriority=true" HTML parameter for a particular media player). In further implementations, so-called hidden or helper media players recognized as being necessary to a document's operation are included as mandatory media players. Hidden or helper media players can be identified as having a 0x0 or 1x1 display area, for example.

A mandatory media player is selected (218) and loaded (219). If there are more mandatory players to load (220), the technique continues at 218. Otherwise, the technique continues at 214 wherein remaining non-loaded players are prioritized (214). In various implementations, one or more of the factors from TABLE 1 are used to prioritize the non-loaded players. Players having a higher priority are more likely to be loaded. Other factors for prioritizing non-loaded players are possible.

TABLE 1

| FACTOR | DESCRIPTION | PRIORITY |
| --- | --- | --- |
| Prominent/Centered | In some implementations, the subset of players to load is determined based on a comparison between the locations of one or more of the players. For example, a comparison can be performed between rectangles describing the respective player's coordinates in hypertext mark-up language (HTML) window. Those players that are determined to be prominent or centered are prioritized over other players. For example, a comparison can be performed between rectangles describing the respective players to determine players that are more prominent or more centered in the document than other players. | High |
| Largest pixel area | In some implementations, the subset of players to load is determined based on a comparison between the pixel areas of each player. For example, a comparison can be performed between the rectangles describing the respective player's relative size (e.g., pixel area = length of rectangle * width of rectangle). Those players that are determined to have larger pixel areas are prioritized over players with smaller pixel areas. | High |
| On screen | In some implementations, the subset of players to load is determined based on determining if the player is on screen. In such implementations, a comparison is made using techniques described below. Players that are determined to be on screen are generally prioritized before players that are off screen. | Medium |
| Off screen | In some implementations, the subset of players to load is determined based on determining if the player is off screen. In such implementations, a comparison is made using techniques described below. Players that are determined to be off screen are generally | Low |

TABLE 1-continued

| FACTOR | DESCRIPTION | PRIORITY |
|---|---|---|
| | prioritized lower than players that are on screen. In some implementations, off screen players can also be paused or unloaded to free resources, according to particular implementations. | |
| URL from different domain | In some implementations, the subset of players to load is determined based on a comparison between the domain of the player and the domain of the document. In general, a domain specifies the origin of the player or document, or both. For example, a universal resource locator (URL) www.mydomain.com specifies "mydomain.com" as the domain. This technique can be used to prioritize document-specific content over advertisements and other non-document specific content, or vice versa, depending on the intended implementation. | Low |
| Initially invisible | In some implementations, the subset of players to load is determined according to whether any of the players are initially invisible. For example, if one or more players are initially invisible, either because they are off screen or for other reasons, those players can be prioritized lower than other players. In such implementations, invisible players can be loaded when they are no longer invisible. | Low |
| Pixel area that of a typical advertisement | In some implementations, the subset of players to load is determined according to predetermined pixel areas that are indicative of an advertisement. For example, in some implementations, so-called banner ads can have a pixel area of 468 × 60 pixels. Other dimensions and advertisements are also possible. | Low |
| HTML parameter used to rank instances | In some implementations, the subset of players to load is determined according to code contained in the document. For example, hypertext mark-up language (HTML) code can be used to specify one or more mandatory players that a module or other program logic should load before loading any other players (e.g., by specifying a "mustLoad" HTML parameter as being equal to true for a particular player). | Rank according to parameter |

Referring again to technique 200, a non-loaded player is selected (222). In some Implementations, the player is selected according to its respective priority. In some implementations, the player is selected according to received input from a user. For example, if a user clicks on a player or otherwise provides input that identifies a player, that player can be selected for loading. Once selected, the player is loaded (216) using a variety of techniques. One example technique is described below in reference to FIG. 2B, but other techniques may be used, according to particular implementations. If there are more non-loaded players (224), the technique continues at 222. For example, in some implementations, additional non-loaded players are identified by accessing a list of deferred players and determining if there are any deferred players that have not been loaded. Otherwise, if there are no more non-loaded players, the technique can terminate. Performance of the technique 200 in one case is triggered by user interaction with an image displayed in the document (204) as a proxy for a loaded media player.

Figure 2B:
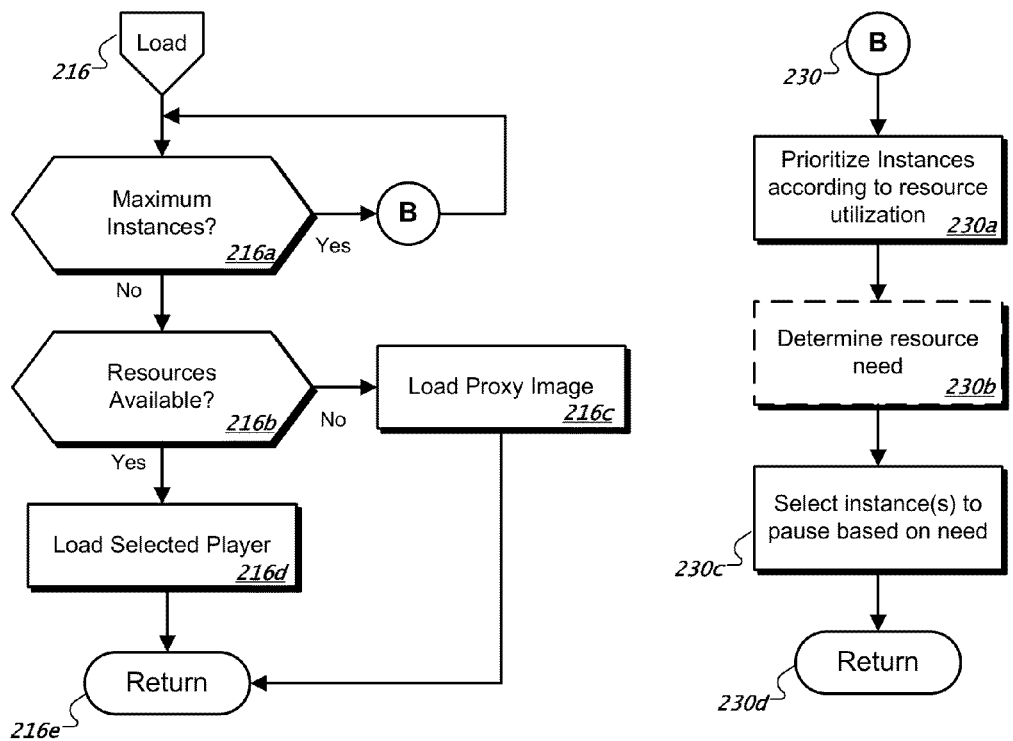

FIG. 2B illustrates an example technique 216 for loading a selected media player. In some implementations a maximum number of media players that can be loaded at any given time is a predetermined number (e.g., four) or is a number derived from an evaluation of the current state of the computing device's resource usage. If a maximum number of loaded players has been reached (step 216a), then the technique 230 is invoked to unload or pause loaded players to free resources. (Technique 230 is described further below.) Continuing with technique 216, if the maximum number of media players that can be loaded at any given time has not been reached, then it is determined whether there are sufficient resources available (216b) for loading the selected player. If not, a so-called proxy image is displayed (216c) in the document in place of where the rendered content would appear. For example, a representative image or frame from the content can be selected as the proxy image or a default image can be chosen (e.g., a text message that informs the user to click on the proxy image to load the content). If there are resources available for loading the selected player, then the player is loaded (216d) according to the type of player (e.g., Adobe Flash Player) and the technique 216 returns from whence it was invoked (216e).

Returning to technique 230, loaded media players are prioritized according to their resource utilization (step 230a). In some implementations, a given media player's resource utilization is determined based on the area of the media player's display in a document (e.g., the larger the display area, the more memory and CPU cycles required to render content). Other ways of determining resource utilization are possible. In some implementations, a module or other program logic can query the operating system to receive information regarding the amount of memory, the amount of CPU utilization, the remaining battery life, network bandwidth, or other resources. For example, in some implementations, an application program interface (API) can be used to query the operating system by providing one or more parameters (including a HKEY_PERFORMANCE_DATA parameter) to a RegQueryValueEx method which can provide information corresponding to resources usage. Optionally, in some implementations, the resources that would be needed by the selected player to be loaded are determined (230b). Furthermore, one or more loaded players are paused in order to free the needed resources (230c). In some implementations, the players to pause are prioritized according to one or more factors including, but not limited to off screen non-mandatory players, advertisement sized players, and players that are only partially displayed. For example, off screen players that are not mandatory can be paused before partially displayed players or advertisement sized players, according to particular implementations. In some implementations, off screen players that are mandatory players are not paused. For example, if a media player has a corresponding HTML parameter "mustLoad=true" or "hasPriority=true," then that media player is not paused if the player is off screen. In some implementations, pausing one or more players can free resources including, but not limited to, CPU utilization, available memory, and network bandwidth because the paused player utilizes a reduced number of resources in comparison to an un-paused player. The technique 230 then returns from whence it was invoked (230d).

Figure 3:
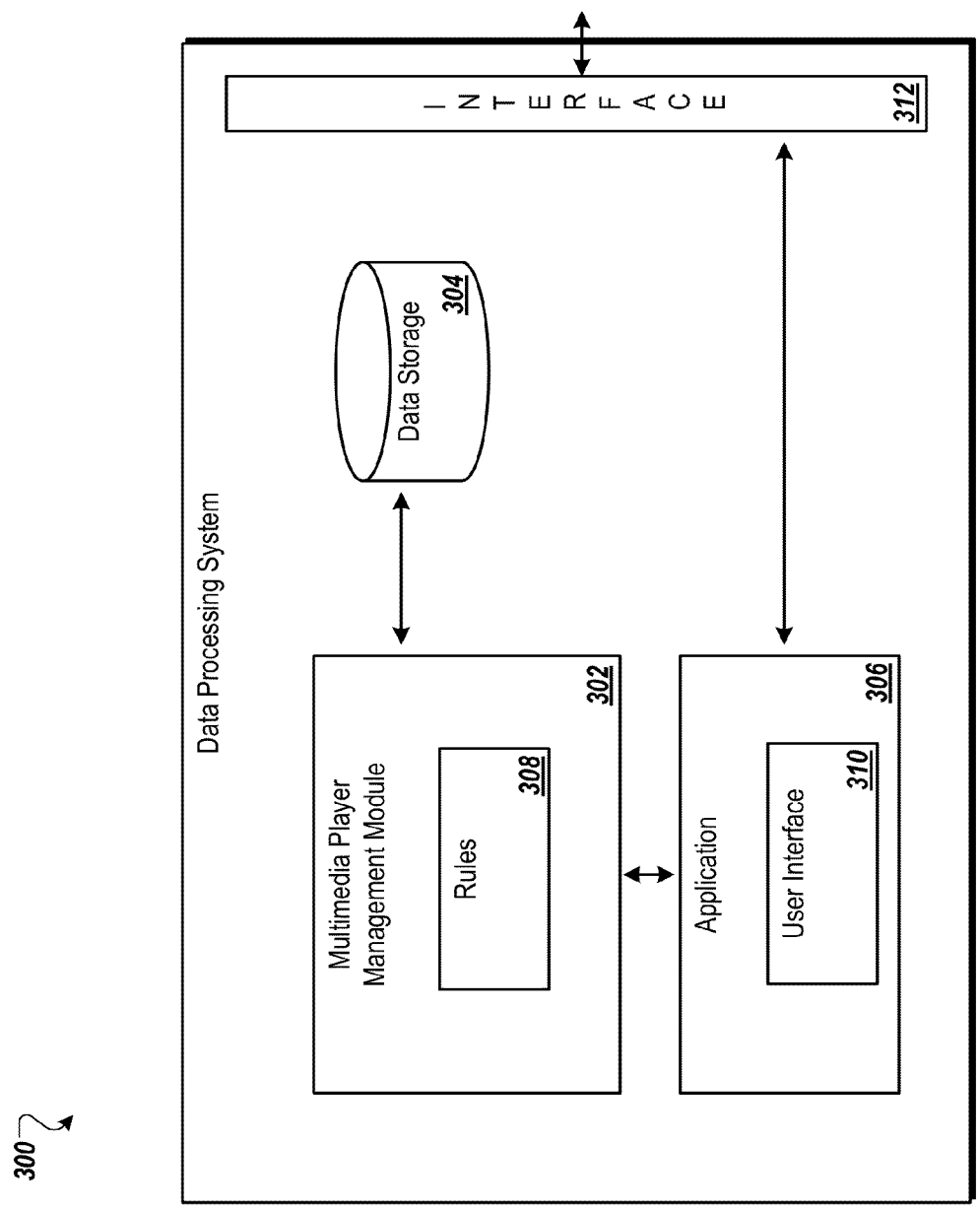
FIG. 3 is a schematic diagram of an example data processing apparatus that can manage one or more media players.

FIG. 3 is a block diagram of an example data processing apparatus 300 that can manage one or more media players. In various implementations, the data processing apparatus 300 can be a desktop computer, a laptop computer, a mobile device, or other computing device. In the depicted example, the data processing apparatus 300 includes a player management module 302, data storage 304, an application 306, and an interface 312. Furthermore, the player management module 302 includes a collection of rules 308, and the application 306 includes a user interface 310.

In some implementations, the module 302 can be implemented as an application that is executed on the data processing apparatus 300. In other implementations, the module 302 is included or otherwise integrated with another application that is executed on the data processing apparatus 300 or as program logic executed on the data processing apparatus 300. For example, the module 302 can be integrated with a browser application by installing the module 302 as a browser application plug-in.

The module 302 also includes one or more rules 308 that can be used to specify certain behaviors of the application 306. For example, in some implementations, the rules 308 can be any or all, or a combination of, the factors and associated priorities listed in TABLE 1. In some implementations, the module 302 can listen for certain events that are triggered by the application 306 and perform certain tasks (e.g., performed by one or more processes or executing program logic) according to the rules 308. In some implementations, the events can include loading a player. In some implementations, the tasks can include deferring the loading of one or more players when a browser application presents a document, prioritizing the loading and presentation of player content according to the rules 308, or other tasks. That is, the rules 308 can be used to determine which players to load, which players to defer loading, or the order to load the deferred players, for instance.

In some implementations, rules 308 can include rules that specify a maximum number of players that are loaded at any one time, rules that specify a certain subset of the players as being mandatory, rules that prioritize the players according to the player's domain, rules that prioritize the players according to the size of the player, rules that prioritize the players according to the order that the browser application requests the players, rules that prioritize the players according to their location in the document, and other rules.

The module 302 can use the rules in any combination or with any weighting to determine an ordering for the players. For example, in some implementations, the module 302 first determines a maximum number of players based on the rules 308 and then determines how many mandatory players are present in the document according to the rules 308. Those mandatory players are loaded first, and any other players can be deferred, ordered according to the order in which the application requests the player, or both. Other combinations and weighting of rules are also possible. In some implementations, the combination of rules and weights can be used to determine a player ranking which can define an ordering for the players. That is, a player with a high rank can be ordered before a player with a lower rank, or vice versa, depending on particular implementations.

In addition to determining an ordering for the players, the module 302 can also communicate with the application 306. For example, the module 302 can communicate with the application 306 to do any of following: defer loading of one or more players, instruct the application 306 that one or more players has been successfully loaded, store state information regarding one or more players in the data storage 304, provide the stored state information stored in the data storage 304 to the application 306, or combinations of these. For example, in some implementations, the module 302 can communicate with the application 306 through an application program interface (API). On example APIs is the Netscape plugin API (NPAPI), but other APIs can also be used. In some implementations, the API allows the module 302 to control the allocation of resources without interrupting the user's experience. That is, because the application 306 believes that the players have been successfully loaded, even though the module 302 has deferred their loading to ration resources, the application 306 does not present the user with an error message or other message that can interrupt the user's interaction with the application 306.

In some implementations, the module 302 can utilize a data structure to control the allocation of resources. For example, the module 302 can use the data structure to store information corresponding to the ordering of the instances, the HTML parameters of deferred instances, or for other purposes. In some implementations, the data structure can include one or more values listed in TABLE 2.

TABLE 2

| VALUE | DESCRIPTION |
| --- | --- |
| NPWindow* npWindow | In some implementations, the npWindow value specifies the browser window (e.g., a Netscape window) that is drawn into. |
| NPP npInstance | In some implementations, the npInstance value specifies an API instance (e.g., a Netscape Plugin instance) that is used. |
| NPStream* stream | In some implementations, data can be received from more than one URLStream. In such implementations, the stream variable can be used to distinguish between different URLStreams. |
| int mode | In some implementations, the mode value specifies a Window mode. |
| S16 argc | In some implementations, the argc value specifies the number of HTML parameters. |
| char** argn | In some implementations, the argn value specifies the names of each of the html parameters. |

TABLE 2-continued

| VALUE | DESCRIPTION |
| --- | --- |
| char** argv | In some implementations, the argv value specifies the values of each of the html parameters. |
| const char* decodedUrl | In some implementations, the decodedUrl value specifies the URL of the swf to load. In some implementations, the URL is decoded. |
| const char* streamUrl | In some implementations, the streamUrl value specifies the raw (e.g., coded) URL of the swf to load. |
| const char* headers | In some implementations, the headers value specifies the HTML headers. |
| U32 streamLength | In some implementations, the streamLength value specifies the total length of the data stream. |
| U32 streamPosition | In some implementations, the streamPosition value specifies the current position of the data stream. |
| BYTE* dataBuffer | In some implementations, the dataBuffer value specifies the actual swf data. That is, the content presented by a media player. |
| bool m_deferralDone | In some implementations, the m_defferalDone value is a Boolean value that specifies if the module 302 is done deferring media players, or still deferring the startup of media players. |
| S16 streamDoneReason | In some implementations, the streamDoneReason value specifies a reason why an API (e.g., NPAPI) closed a data stream. |
| U16 stype | In some implementations, the stype value specifies extra data as needed by the module 302. |
| void* notifyData | In some implementations, the notifyData value specifies a location in memory where an asynchronous identifier of the data stream is stored. |
| void* pdata | In some implementations, the pdata value specifies a location in memory where the particular media player data is stored. |

The data structure can also include additional values not shown in TABLE 2, according to particular implementations.

The data storage 304 can be any variety of computer-readable storage including a hard drive, memory (e.g., read-only memory (ROM), random access memory (RAM), or other memory), or any other computer-readable storage. In some implementations, the data storage 304 communicates with the module 302 allowing the module 302 to store or retrieve state information corresponding to one or more players that have been deferred, an order for loading the deferred players, or for other purposes. In some implementations, the module 302 can remove information from the data storage 304 after a deferred player is loaded. For example, the module 302 can remove state information for the data storage 304. As another example, the module 302 can remove the loaded player from the ordering, or other information from the data storage 304.

The application 306 is any application that can interact with a document. For example, in reference to FIGS. 1A and 1B, the application 306 is a browser application that can present one or more electronic documents. Example browser applications include, but are not limited to, Firefox developed by Mozilla Incorporated of Mountain View, Calif., Internet Explorer developed by Microsoft Corporation of Redmond, Wash., Safari developed by Apple Incorporate of Cupertino, Calif., and Chrome developed by Google Incorporated of Mountain View, Calif. Other applications are also possible.

Additionally, the application 306 includes a user interface 310. In some implementations, the user interface provides a graphical representation of the document and one or more mechanisms to interact with the document. For example, in reference to FIGS. 1A and 1B, the GUI includes a scrollbar 102 that provides the user a mechanism to select the portion of a document that is presented by the browser application, as described above. Other mechanisms include buttons, editable fields, selectable text (e.g., hyperlinks), and other graphical or text-based widgets. Other mechanisms are also possible.

The application 306 communicates with an interface 312. The interface 312 can comprise software (e.g., a communication protocol), hardware (e.g., an Ethernet card), or combinations of these. The interface 312 allows the data processing apparatus 300 to communicate with other data processing apparatus 300. For example, the interface 312 allows the data processing apparatus 300 to communicate over a network (e.g., a local area network (LAN) or wide area network (WAN)) allowing the data processing apparatus 300 to communicate with a server or other device. That is, in some implementations, the interface 312 receives data from a web server corresponding to one or more documents and content associated with the documents, such as content 104a-104e. For example, in reference to FIGS. 1A and 1B, in some implementations, the interface 312 receives data corresponding to HTML code that is provided to the computing device 300 executing a browser application. The interface 312 of the computing device 300 receives the data and provides it the browser application which interprets the HTML code to present one or documents including content 104a-104e associated with any of the loaded players.

Figure 4:
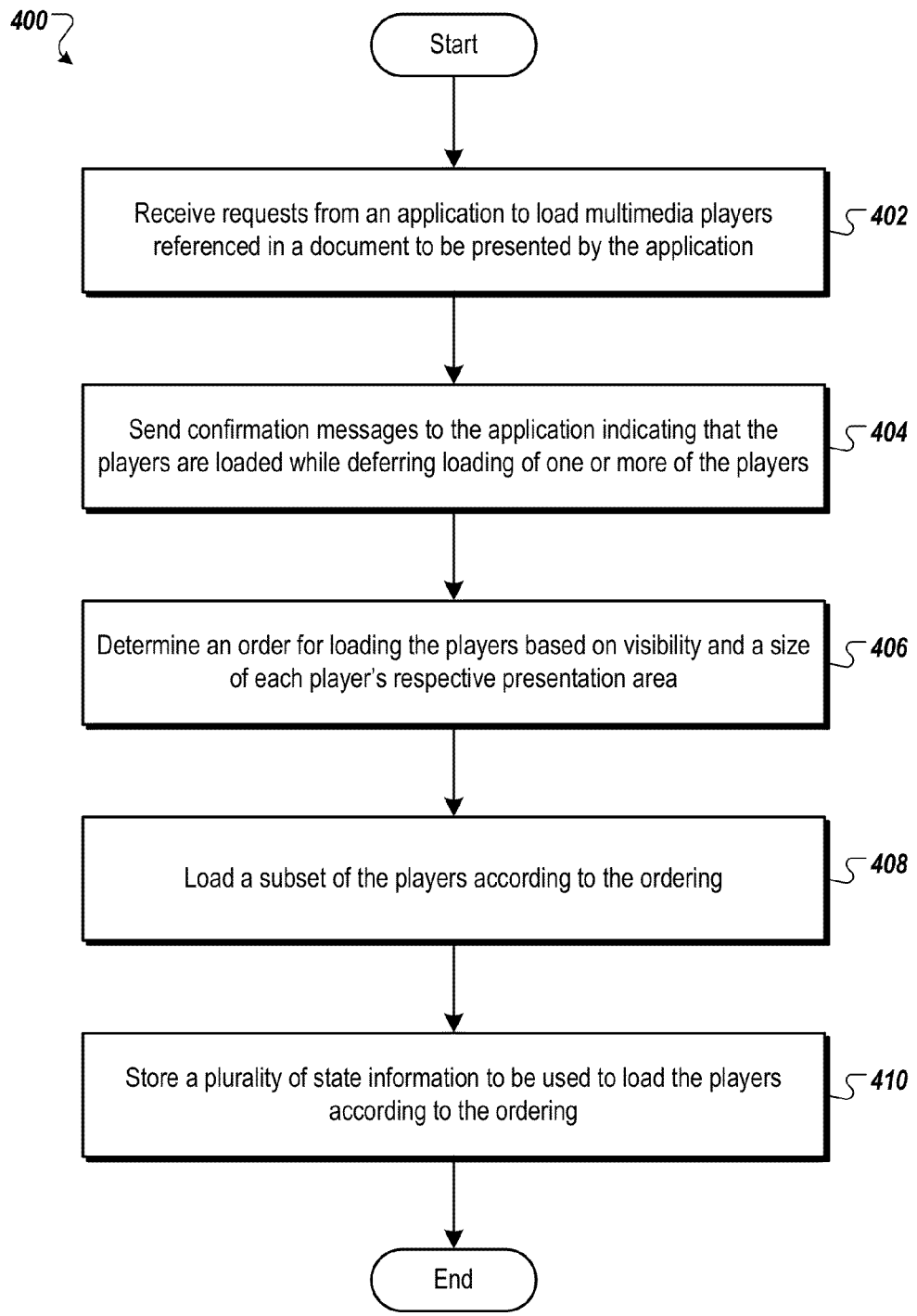
FIG. 4 is a flow chart of an example technique for managing one or more media players.

FIG. 4 is a flow chart of an example technique 400 for managing one or more media players. For convenience, technique 400 is described in reference to FIGS. 1A, 1B, 3, and a system that performs technique 400. For example, in some implementations, the technique 400 can be executed by the multimedia management module 302.

The system receives one or more requests from an application to load players referenced in a document to be presented by the application (402). For example, in reference to FIGS. 1A and 3, the system receives requests from the application (e.g., web browser) to load players associated with any of content 104a-104e. In some implementations, the requests are received by the management module 302 through an API. For example, the requests can be received through the Netscape plugin API (NPAPI).

In response to receiving the request, the system sends one or more confirmation messages to the application indicating the players are loaded while deferring loading of one or more of the players (404). For example, in reference to FIGS. 1A and 3, the management module 302 sends confirmation messages to application 306 indicating that each of the players associated with their respective content 104a-104e have been loaded. Furthermore, the management module 302 defers the loading of players associated content 104d and 104e. As such, the application 306 continues to function as if all of the players had loaded successfully, thereby obfuscating any change in execution to the user notwithstanding the system deferring loading one or more of the players. That is, because the application 306 believes that all of the players have loaded, it does not halt execution to present a user with an error message or otherwise present any indication that the application 306 is not executing properly.

In some implementations, the system defers a number of players according to a memory threshold, a CPU threshold, a battery power threshold, a network bandwidth threshold, or combinations of these. In some implementations, the system can also defer a number of players according to a maximum player threshold. For example, in reference to FIG. 3, rules 308 can include a maximum player threshold of four, whereby once four players have been loaded, any remaining players that the application 306 requests are deferred by the management module 302. Furthermore, in some implementations, the system defers a number of players according to a domain determination. For example, the management module can parse the URLs of the players and the document, and players that have a domain that is substantially different than the domain of the document can be deferred.

The system determines an order for loading the players based on visibility and size of each player's respective presentation area (406). For example, in reference to FIG. 3, the management module 302 can determine an order according to which of the players are visible and the pixel size of the visible players. That is, in some implementations, the module 302 can identify the players currently presented by comparing the coordinates of the browser application's view window with the coordinates of the current visible rectangle of the HTML page (e.g., using a javascript document object model (DOM) routine in an API). Furthermore, in some implementations, the module 302 can prioritize the visible players with the largest number of pixels first in the ordering. Other orderings are also possible based on the rules 308, according to particular implementations.

The system loads a subset of the players according to the ordering (408). In some implementations, the number of players to load is determined by a maximum number of players. For example, in reference to FIG. 3, the module 302 can load only the first four players in the ordering. Other subsets of players are also possible. In some implementations, technique 216 can be used to load the players.

The system stores a plurality of state information to be used to load the players according to the ordering (410). For example, in reference to FIG. 3, the management module 302 can store HTML parameters, URLs, name-value pairs, or other data in the data storage 304. In some implementations, the system only stores state information for players that are deferred. For example, in reference to FIG. 1A, the system only stores state information for players associated with content 104d and 104e, because those players are deferred.

In some implementations, the system can use the stored state information to load any of the players in the ordering. For example, in reference to FIG. 3, the module 302 can retrieve the stored state information from data storage 304. Thereafter, the module 302 can use any of the HTML parameters, URLs, name-value pairs, or other stored data to load one or more players, one or more place holder images, present content associated with the players, or combinations of these. For example, in reference to FIGS. 1A-3, when the user uses scrollbar 102, and the browser application presents content 104d and 104e, the module 302 can load the stored state information for the player associated with content 104d and 104e and load the players associated with the content 104d and 104e. In response, the browser application can present the content 104d and 104e in the respective player as if the browser application had received HTML code from a web server or other source. That is, the loading of the state information from the data storage 304 can provide a mechanism to load players without substantially altering the user experience or otherwise alerting the user that the loading of one or more players are deferred. In some implementations, the state information can also include a static image to present the user. For example, the state information can include a memory address, file path, or other identifying information that specifies which static image the deferred player should present to the user.

Figure 5:
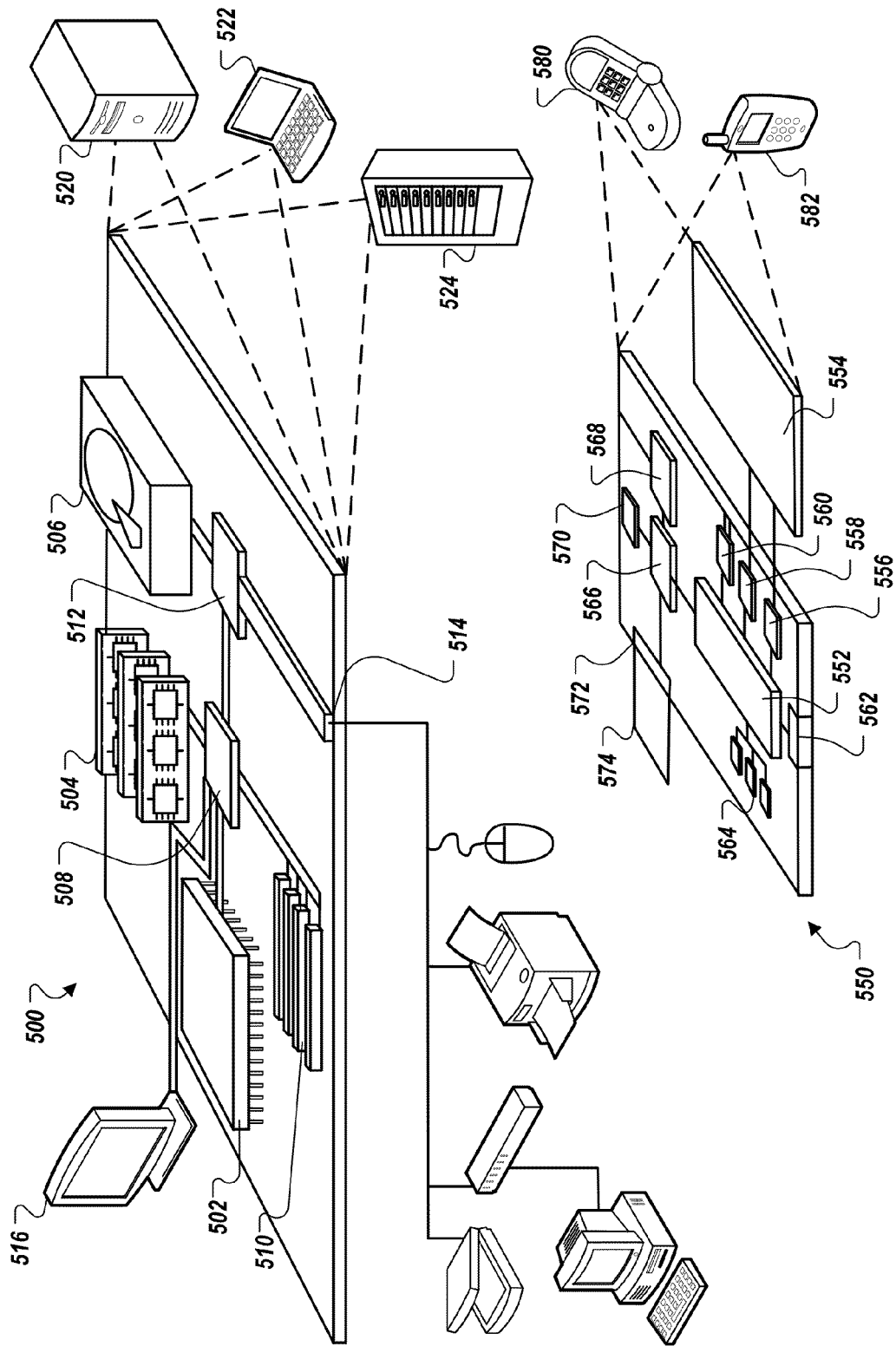
FIG. 5 is a schematic diagram of an example of a generic computer system

FIG. 5 is a schematic diagram of an example of a generic computer systems 500 and 550 that can be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 505 connecting to memory 504 and high-speed expansion ports 510, and a low speed interface 512 connecting to low speed bus 514 and storage device 506. Each of the components 502, 504, 506, 505, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 505. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 505 manages bandwidth-intensive operations for the computing device 500, while the low speed controller 512 manages lower bandwidth-intensive operations. Such allocation of duties is exemplary only. In one implementation, the high-speed controller 505 is coupled to memory 504, display 516 (e.g., through a graphics processor or accelerator), and to high-speed expansion ports 510, which can accept various expansion cards (not shown). In the implementation, low-speed controller 512 is coupled to storage device 506 and low-speed expansion port 514. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, an input/output device such as a display 554, a communication interface 566, and a transceiver 565, among other components. The device 550 can also be provided with a storage device, such as a microdrive or other device, to provide additional storage. Each of the components 550, 552, 564, 554, 566, and 565, are interconnected using various buses, and several of the components can be mounted on a common motherboard or in other manners as appropriate.

The processor 552 can process instructions for execution within the computing device 550, including instructions stored in the memory 564. The processor can also include separate analog and digital processors. The processor can provide, for example, for coordination of the other components of the device 550, such as control of user interfaces, applications run by device 550, and wireless communication by device 550.

Processor 552 can communicate with a user through control interface 555 and display interface 556 coupled to a display 554. The display 554 can be, for example, a TFT LCD display or an OLED display, or other appropriate display technology. The display interface 556 can comprise appropriate circuitry for driving the display 554 to present graphical and other information to a user. The control interface 555 can receive commands from a user and convert them for submission to the processor 552. In addition, an external interface 562 can be provide in communication with processor 552, so as to enable near area communication of device 550 with other devices. External interface 562 can provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 can also be provided and connected to device 550 through expansion interface 572, which can include, for example, a SIMM card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 565. In addition, short-range communication can occur, such as using a Bluetooth, WiFi, or other such transceiver (not shown). In addition, GPS receiver module 570 can provide additional wireless data to device 550, which can be used as appropriate by applications running on device 550.

Device 550 can also communication audibly using audio codec 560, which can receive spoken information from a user and convert it to usable digital information. Audio codex 560 can likewise generate audible sound for a user, such as through a speaker, e.g., in a handset of device 550. Such sound can include sound from voice telephone calls, can include recorded sound (e.g., voice messages, music files, etc.) and can also include sound generated by applications operating on device 550.

The computing device 550 can be implemented in a number of different forms, as shown in the figure. For example, it can be implemented as a cellular telephone 550. It can also be implemented as part of a smartphone 552, personal digital assistant, or other similar mobile device.

An electronic document (which for brevity will simply be referred to as a document) does not necessarily correspond to a file. A document may be stored in a portion of a file that holds other documents, in a single file dedicated to the document in question, or in multiple coordinated files.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
   receiving one or more requests from an application to load a plurality of media players referenced in a document to be presented by the application, each of the media players configured to present respective content in respective presentation areas of the document;
   analyzing the document to identify one or more media players of the plurality of media players that are designated as mandatory media players;
   sending one or more confirmation messages to the application to cause the application to load the one or more media players of the plurality of media players that are designated as mandatory media players;
   determining a priority order for loading one or more remaining media players of the plurality of media players based on a visibility of each of the remaining media players when the document is presented and based on dimensions of each remaining media player's respective presentation area; and
   loading the one or more remaining media players according to the priority order, the loading comprising limiting a number of the remaining media players that are loaded based on a threshold number of media players.

2. The method of claim 1, wherein loading the one or more remaining media players comprises determining resources available for the remaining media players and limiting a number of the remaining media players that are loaded based on the resources available.

3. The method of claim 1, wherein one or more of the remaining media players having respective presentation areas in a first size range are given a higher priority in the priority order than one or more other remaining media players having respective presentation areas that are not in the first size range.

4. The method of claim 1, wherein one or more of the remaining media players having respective content associated with a first domain associated with the document are given a higher priority in the priority order than one or more other media players having respective content associated with a different second domain different which is not associated with the document.

5. The method of claim 1, further comprising determining that a first loaded media player's respective presentation area is no longer visible and pausing the first media player.

6. The method of claim 1, wherein the application is a web browser.

7. The method of claim 1, wherein the document includes a respective rank for one or more of the remaining media players, and wherein the priority order is based on the respective ranks.

8. The method of claim 1, further comprising receiving a plurality of stored state information, wherein the state information is used to load the remaining media players according to the priority order.

9. A non-transitory computer-readable storage medium comprising program instructions stored thereon that, responsive to execution by a data processing apparatus, perform operations comprising:
   receiving one or more requests from an application to load a plurality of media players referenced in a document to be presented by the application, each of the media players configured to present respective content in respective presentation areas of the document;
   sending one or more confirmation messages to the application to cause the application to load at least one mandatory media player of the plurality of media players;
   determining a priority order for loading one or more remaining media players of the plurality of media players based on one or more priority factors, wherein the determining the priority order comprises giving one or more of the remaining media players having respective presentation areas in a first size range a higher priority in the priority order than one or more other media players having respective presentation areas that are not in the first size range; and
   loading the one or more remaining media players according to the priority order.

10. The non-transitory computer-readable storage medium of claim 9, wherein loading the one or more remaining media players comprises determining resources available for the one or more remaining media players that are loaded based on the resources available.

11. The non-transitory computer-readable storage medium of claim 9, wherein loading the one or more remaining media players comprises limiting a number of the remaining media players that are loaded based on a threshold number of media players.

12. The non-transitory computer-readable storage medium of claim 9, wherein one or more of the remaining media players having respective content associated with a first domain associated with the document are given a higher priority in the priority order than one or more other media players having respective content associated with a different second domain different which is not associated with the document.

13. The non-transitory computer-readable storage medium of claim 9, further comprising determining that a first loaded media player's respective presentation area is no longer visible and pausing the first media player.

14. The non-transitory computer-readable storage medium of claim 9, wherein the application is a web browser.

15. The non-transitory computer-readable storage medium of claim 9, wherein the document includes a respective rank for one or more of the media players and wherein the priority order is based on the respective ranks.

16. The non-transitory computer-readable storage medium of claim 9, further comprising receiving a plurality of stored state information wherein the state information is used to load the remaining media players according to the priority order.

17. A system comprising:

a display device;

one or more processors; and a computer-readable storage medium comprising program instructions stored thereon that, responsive to execution by the one or more processors, perform operations comprising:

receiving one or more requests from an application to load a plurality of media players referenced in a document to be presented by the application on the display device, each media player configured to present respective content in respective presentation areas of the document;

sending one or more confirmation messages to the application to cause the application to load at least one mandatory media player of the plurality of media players, and deferring loading of one or more remaining media players of the plurality of media players;

determining a priority order for loading the one or more remaining media players of the plurality of media players based on a visibility of each of the remaining media players when the document is presented and based on dimensions of each remaining media player's respective presentation area; and loading the one or more remaining media players according to the priority order, the loading comprising limiting a number of the remaining media players that are loaded based on a threshold number of media players.

18. The system of claim 17, wherein one or more of the media players having respective presentation areas in a first size range are given a higher priority in the priority order than one or more other media players having respective presentation areas that are not in the first size range.

* * * * *